Nov. 4, 1969  R. L. KITTELSON  3,476,427
SPRING LOADED GATE FASTENER
Filed April 21, 1967
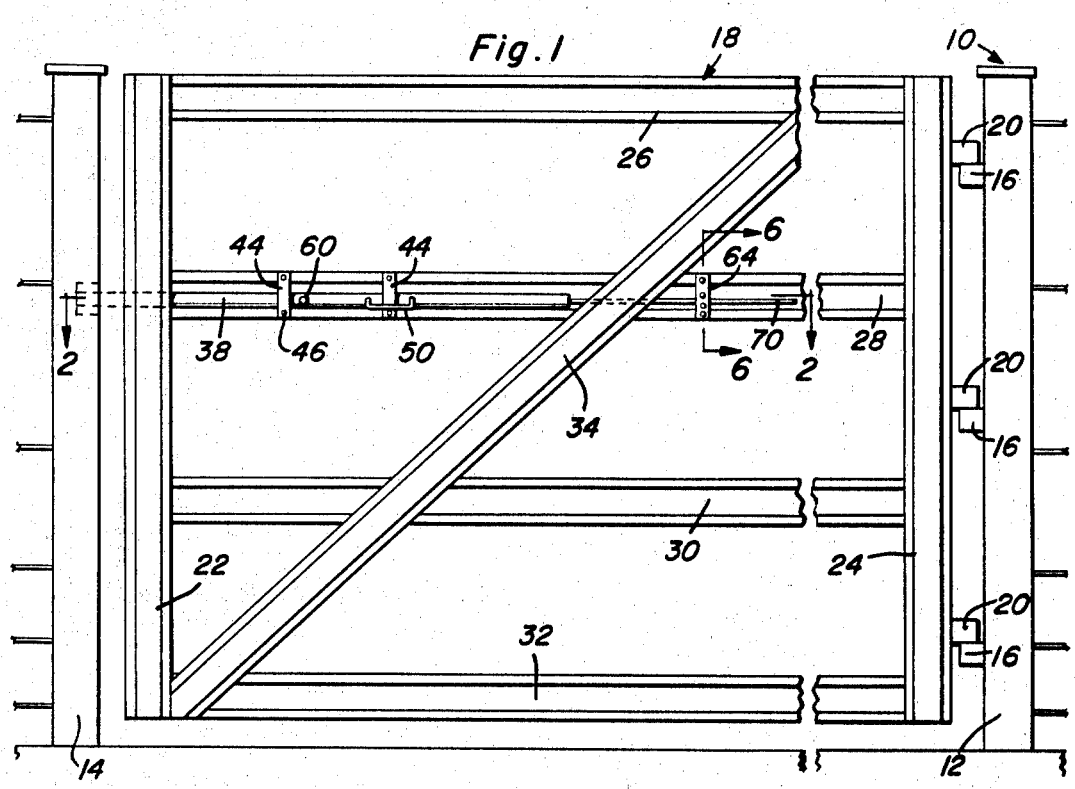
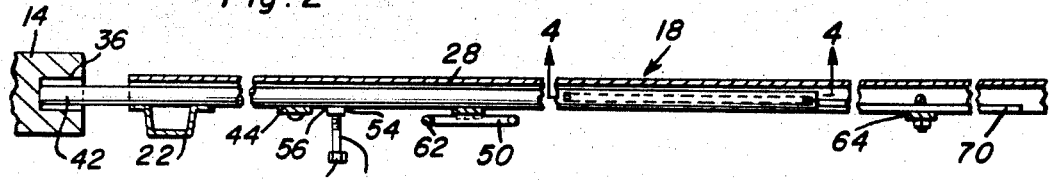
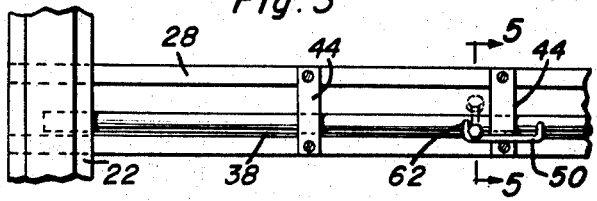
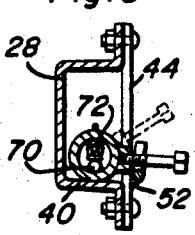
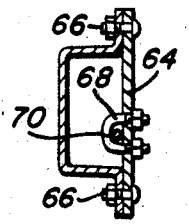
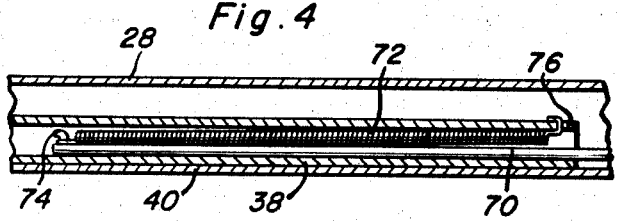
Ronald L. Kittelson
INVENTOR.
BY *Clarence A. O'Brien*
*and Harvey B. Jacobson*
Attorneys United States Patent Office 3,476,427
Patented Nov. 4, 1969

3,476,427
SPRING LOADED GATE FASTENER
Ronald L. Kittelson, Thunder Hawk, S. Dak. 57655
Filed Apr. 21, 1967, Ser. No. 632,719
Int. Cl. E05c 1/10
U.S. Cl. 292—175            9 Claims

ABSTRACT OF THE DISCLOSURE

A spring loaded fastener for a gate construction including an elongated latching pin to be supported for longitudinal reciprocation generally radially of the axis of rotation of an associated gate and for shifting between an extended locking position projecting beyond the free swinging edge of the gate and a retracted inoperative position retracted inwardly from the free swinging edge of the gate, the latching pin being supported from a tubular guide in which the pin is at least partially telescoped and which encloses an expansion spring operatively connected between the pin and the tubular guide for yieldingly urging the latching pin toward an extended operative position.

---

The instant invention relates to a simplified latch construction adapted to be readily mounted on substantially any swingable gate member and to be utilized as a means to releasably latch the associated gate member in a closed position. The invention comprises a spring-retracted slidable bolt mounted in a horizontally disposed channel member of a gate, and extending beyond one end thereof for engagement with a gate post. A vertically disposed channel member, whose open side faces the open side of the first member, is secured to that member, and forms the end member of the gate.

The main object of this invention is to provide a gate latching fastener assembly which will be readily mountable upon and operable to releasably latch substantially all swingable gate constructions in a closed position.

Another object of this invention is to provide a gate latching mechanism including structural and operational features adapting the mechanism for ready mounting upon substantially all gate constructions.

A final object of this invention to be specifically enumerated herein is to provide a spring loaded gate fastener or latching mechanism which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of a fence construction having a gate opening therein and a horizontally swingable gate member operatively associated with the fence construction for closing the gate opening, the spring loaded gate fastener or latching assembly of the instant invention being operatively associated with the gate member and the fence construction post with which the free swinging edge of the gate member is registrable;

FIGURE 2 is an enlarged horizontal sectional view taken substantially upon the plane indicated by the section line 2—2 of FIGURE 1;

FIGURE 3 is a fragmentary elevational view of the portion of the gate member from which the spring loaded gate fastener or latching mecahnism is supported and with the latching pin of the gate fastener retained in a retracted inoperative position and a slightly angularly rotated release position of the latch pin illustrated in phantom lines;

FIGURE 4 is an enlarged fragmentary sectional view taken substantially upon the plane indicated by the section line 4—4 of FIGURE 2;

FIGURE 5 is an enlarged vertical sectional view taken substantially upon the plane indicated by the section line 5—5 of FIGURE 3; and FIGURE 6 is an enlarged fragmentary vertical sectional view taken substantially upon the plane indicated by the section line 6—6 of FIGURE 1.

Referring now more specifically to the drawings, the numeral 10 generally designates a fence assembly which includes a pair of gate posts 12 and 14. The gate post 12 includes a plurality of hinge members 16 from which a gate member referred to in general by the reference numeral 18 is supported by means of coacting hinge members 20. In this manner, the gate member 18 is hingedly supported from the post 12 for movement about a vertical axis extending through the overlapped portions of corresponding hinge members 16 and 20 and the gate member 18 may be swung between open positions and a closed position with the free swinging edge portion of the gate member 18 registered with the gate post 14.

The gate member 18 includes a pair of upstanding opposite side members 22 and 24 which are generally channel-shaped in configuration and open toward one side of the gate member 18. The members 22 and 24 are interconnected by means of vertically spaced horizontal members 26, 28, 30 and 32 which are also generally channel-shaped and open toward the other side of the gate member 18. In addition, the gate member 18 includes a channel-shaped diagonal member 34 secured to the members 26, 28, 30 and 32 and which opens toward and overlies the open sides of the members 26, 28, 30 and 32.

The gate post 14 includes a horizontal recess 38 opening outwardly of the side of the post 14 facing toward the post 12 and defining a keeper recess for the gate fastener of the instant invention.

The gate fastener of the instant invention includes a tubular latching pin 38 received within the confines of the channel member 28 an slidably supported from the lower horizontal leg portion 40 thereof. The lower portion of the channel member 28 is registered with and opens outwardly at one end toward the recess 36 and therefore the latching pin 38 may be shifted longitudinally along the channel member 28 for extension into and retraction from a position with one end portion 42 of the latching pin 38 seated in the recess. The fastener assembly of the instant invention includes a pair of guiding and confining straps 44 secured across the open side of the channel member 28 at points spaced longitudinally therealong by means of suitable fasteners 46 and the straps 44 therefore support the tubular latching pin 38 against displacement outwardly of the open side of the channel member 28 when the latching pin 38 is retracted inwardly of the member 22. Further, the strap 44 furthermost from the member 22 includes an upwardly opening U-shaped retaining member 50 secured to the outer surface thereof in any convenient manner such as by welding 52. The retaining member 50 is generally horizontally alined with the latching pin 38 and the latter includes a threaded nut 54 secured to the latching pin 38 by welding 56 and in which the externally threaded end portion 58 of a bolt 60 extending generally radially outwardly from the tubular latching pin 38 is threadedly engaged. The bolt 60 may be utilized to effect angular displacement of the latching pin 38 about its longitudinal axis in a manner which is believed to be clearly apparent from FIGURE 5 of the drawings so as to position the bolt 60, upon longitudinal displacement of the latching pin 38, between the leg portion 62 of the retaining member 50 adjacent the member 22 and the strap 44 from which the retaining member 50 is supported.

With reference now more specifically to FIGURE 6 of the drawings it may be seen that a third strap 64 is secured across the open side of the channel member 28 by means of suitable fasteners 66 and that the strap 64 has mounted thereon a U-clamp assembly 68 comprising, together with the strap 64, an anchor member stationarily positioned relative to the gate member 18.

An elongated rod 70 is provided and has one end portion clampingly supported from the clamp assembly 68 in a manner which is believed to be obvious from FIGURE 6 of the drawings and the other end portion of the rod 70 is telescoped into the end of the tubular latching pin 38 remote from the end portion 42 thereof. An expansion spring, also telescoped into the tubular latching pin 38 is referred to by the reference numeral 72 and has one end secured to a hook 74 carried by the end of the rod 70 remote from the clamp assembly 68 and its other end hooked through a radial bore 76 formed in the end portion of the tubular latching pin remote from the end portion 42 thereof. In this manner, the expansion spring 72 yieldingly urges the latching pin 38 to the left as viewed in FIGURES 1–4 of the drawing. Accordingly, it may be seen that the latching pin 38, when the bolt 60 is removed from behind the leg portion 62, may be urged into position with the end portion 42 seated in the recess 36. However, the threaded nut 54 is engageable with the strap 44 adjacent the member 22 and thereby limits extension of the latching pin 38 and the nut 54 or bolt 60 is engageable with the strap 44 remote from the member 22 to limit retraction of the latching pin 38. Of course, inasmuch as the rod 70 may be clamped in adjusted positions relative to the clamp assembly 68, the biasing force directed upon the latching pin 38 by the expansion spring 72 may be readily adjusted as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a swingable gate member including a first channel member extending along its free swinging edge opening laterally outwardly of one side of said gate member and a second channel member extending between said first channel member and the remote edge portion of said gate member and opening laterally outwardly of the other side of said gate member, the end portion of said second channel member adjacent said first channel member overlapping and opening toward the latter, an elongated latching pin supported from and longitudinally shiftable relative to one of said channel members, said latching pin being received at least substantially entirely within the confines of said one channel member and shiftable through the portion of said one channel member overlapped with the other channel member and to a position with one end thereof projecting at least slightly outwardly of one end of said one channel member for engagement with a stationary keeper assembly.

2. The combination of claim 1 including anchor means stationarily mounted on said gate member, and means connected between said anchor means and said latching pin yieldingly urging the latter in a direction advancing said one end thereof.

3. The combination of claim 2 wherein said means connected between said anchor means and said latching pin includes means for adjusting the biasing force applied thereby on said latching pin.

4. The combination of claim 3 wherein said anchor means includes a clamp assembly stationarily supported from said gate member, said means connected between said anchor means and said latching pin including an enlongated member having one end supported from said clamp assembly in adjusted longitudinally shifted position and the other end overlapping and generally paralleling the other end of said latching pin, and an elongated expansion spring having its opposite end portions connected to the free end portions of the overlapped ends of said latching pin and elongated member.

5. The combination of claim 4 wherein at least said other end of said latching pin is of tubular configuration and said other end of said elongated member is telescoped therein.

6. The combination of claim 5 wherein said expansion spring is at least substantially entirely enclosed within said other end of said latching pin and disposed alongside said other end of said elongated member.

7. The combination of claim 3 wherein said anchor means includes a clamp assembly stationarily supported from said gate member, said means connected between said anchor means and said latching pin including an elongated member having one end supported from said clamp assembly in adjusted longitudinally shifted position and the other end overlapping and generally paralleling the other end of said latching pin, and resilient spring means including first and second portions thereof connected to the adjacent end portions of said latching pin and elongated member.

8. The combination of claim 1 wherein said one channel member comprises said second channel member.

9. The combination of claim 8 wherein said one end of said one channel member comprises the end thereof overlapped with said first channel member.

References Cited

UNITED STATES PATENTS

| 375,604 | 12/1887 | Cedarvall | 292—175 |
| 880,238 | 2/1908 | O'Hara | 287—51 |
| 1,628,502 | 5/1927 | Letzau | 292—175 |
| 3,022,045 | 2/1962 | Silvers | 256—73 |
| 3,163,452 | 12/1964 | Bryson et al. | 292—175 |

FOREIGN PATENTS

| 35,457 | 8/1929 | France. |

RICHARD E. MOORE, Primary Examiner

U.S. Cl. X.R.

292—60